(12) United States Patent
Sakaue et al.

(10) Patent No.: US 7,154,841 B2
(45) Date of Patent: Dec. 26, 2006

(54) OPTICAL INFORMATION RECORDING MEDIUM

(75) Inventors: Yoshitaka Sakaue, Osaka (JP); Ken'ichi Nagata, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 373 days.

(21) Appl. No.: 10/484,993

(22) PCT Filed: Apr. 8, 2003

(86) PCT No.: PCT/JP03/04423

§ 371 (c)(1),
(2), (4) Date: Jul. 12, 2004

(87) PCT Pub. No.: WO03/085651

PCT Pub. Date: Oct. 16, 2003

(65) Prior Publication Data

US 2004/0246881 A1    Dec. 9, 2004

(30) Foreign Application Priority Data

Apr. 9, 2002  (JP) ............................ 2002-106168

(51) Int. Cl.
G11B 7/24       (2006.01)
B32B 3/02       (2006.01)

(52) U.S. Cl. .................... 369/275.2; 369/283; 369/94; 428/64.4

(58) Field of Classification Search ............ 369/275.2, 369/275.1, 275.4, 283, 288, 94, 284, 14, 369/13.31, 110.01, 59.11, 59.12, 47.53; 428/64.4, 428/64.2, 64.6

See application file for complete search history.

(56) References Cited

U.S. PATENT DOCUMENTS

| 5,759,398 | A   |   | 6/1998  | Kielbowicz |
| 5,768,221 | A   |   | 6/1998  | Kasami et al. |
| 6,456,584 | B1  |   | 9/2002  | Nagata et al. |
| 6,660,356 | B1  | * | 12/2003 | Kitaura et al. ............ 428/64.4 |
| 2002/0018428 | A1 |   | 2/2002 | Kurokawa et al. |
| 2002/0031632 | A1 |   | 3/2002 | Hisada et al. |

FOREIGN PATENT DOCUMENTS

| EP | 1118988 A1 | 7/2001 |
| JP | 09-091700  | 4/1997 |
| JP | 10-132982  | 5/1998 |
| JP | 2000-036130 A | 2/2000 |
| JP | 2001-250265 A | 9/2001 |
| JP | 2002-260307 | 9/2002 |
| WO | WO 01/04888 A1 | 1/2001 |

OTHER PUBLICATIONS

Japanese International Search Report for PCT/JP03/04423, dated Jul. 29, 2003.

* cited by examiner

*Primary Examiner*—Ali Neyzari
(74) *Attorney, Agent, or Firm*—RatnerPrestia

(57) ABSTRACT

When initializing first and second information layers on a phase-change optical disk of the one-side multilayered configuration, a mistake occurs depending on thin film configuration of first and second information layers. The phase-change optical disk having a plurality of information layers having at least a recording layer of generating optically detectable reversible change between an amorphous phase and a crystalline phase on a transparent substrate by irradiation of an energy beam and having an optical separation layer formed between the information layers, wherein initialization start positions of crystallizing said plurality of information layers vary by irradiating a laser beam thereon.

15 Claims, 6 Drawing Sheets

OPTICAL INFORMATION RECORDING
MEDIUM

THIS APPLICATION IS A U.S. NATIONAL PHASE APPLICATION OF PCT INTERNATIONAL APPLICATION PCT/JP03/04423.

TECHNICAL FIELD

The present invention relates to an optical information recording medium of recording and reproducing information at high speed and high density by using optical means such as a laser beam.

BACKGROUND ART

Reproducing or recording high-density information by utilizing a laser beam has been mainly put into practical use as an optical disk.

The optical disks can be broadly classified into a reproduction-only type, a recordable type and a rewritable type. The reproduction-only type is put into practical use as a compact disk and a laser disk, and the recordable type and rewritable type are put into practical use as a document file, a data file and so on. The rewritable optical disks are mainly classified into a magnet-optical type and a phase-change type. The phase-change optical disk exploits a reversible state change occurring to a recording layer between an amorphous state and a crystalline state (or between crystals and crystals of further different structure) due to irradiation of the laser beam. To be more specific, the irradiation of the laser beam changes at least one of a refractive index and an extinction coefficient of a thin film so as to perform recording. And amplitude of transmitted light or reflected light changes in this portion so that transmitted light volume or reflected light volume leading to a detection system consequently changes, which is detected so as to reproduce a signal.

In general, a state in which a recording layer material is in the crystalline state is an unrecorded state, where the laser beam is irradiated to put the recording layer material in the amorphous state by melting and rapidly cooling it so as to record the signal. In the case of erasing the signal, laser beam power lower than that for recording is irradiated to put the recording layer in the crystalline state. In general, a chalcogen compound is often used as the recording layer material. The recording layer made of the chalcogen compound is formed as a film in an amorphous state, and so it is necessary to put the entire recording area in an unrecorded state by crystallization in advance. This entire crystallization is called initialization. An initialization process is incorporated into a part of a disk manufacturing process, and the recording layer is put in the crystalline state by using the laser beam or a flash light source. In the case of using the laser beam, the laser beam is irradiated while rotating the disk, and is focused on an information layer. The optical head position is radially deviated on the disk so that the entire disk surface is initialized.

There are proposals of a one-side two-layer configuration and a manufacturing method thereof from a viewpoint of increasing a recording capacity of the optical disk (Japanese Patent Application No. 10-132982, Japanese Patent Application No. 2000-400442 (unpublished) and Japanese Patent Application No. 2002-260307 for instance. The disclosure of Application No. 2000-400442 is included in Application No. 2002-260307). Japanese Patent Application No. 2000-400442 describes the manufacturing method of the phase-change optical disk of the one-side two-layer configuration using blue-violet laser light.

The entire disclosure of Japanese Patent Application No. 10-132982 and Japanese Patent Application No. 2002-260307 are incorporated herein by reference in its entirety.

It is a disk characteristic required of a one-side multilayered recording medium that, through the information layer on an incident side of the laser beam of recording and reproducing the information, it must record and reproduce the information in the information layer which is at the back thereof. For that reason, the layer on the front side especially requires a high transmittance (50 percent for instance), and so the recording layer in the information layer must inevitably be thin for that sake.

DISCLOSURE OF THE INVENTION

In consideration of the above problems, an object of the present invention is to provide an optical information recording medium capable of improving production efficiency in an initialization process of optical disk mass production and an initialization method thereof.

To solve the above problems, a first aspect of the present invention is an optical information recording medium having a plurality of information layers formed on a disciform substrate, wherein:

said information layer has at least a recording layer of generating optically detectable reversible change between an amorphous phase and a crystalline phase by irradiation of an energy beam;

signals can be recorded and reproduced in said information layers by the irradiated laser beam;

the recording layers included in said information layers are crystallized in a concentric strip-shape by the laser beam in advance; and a reflection coefficient at a laser beam wavelength of crystallizing said recording layer in advance in the area of another information layer opposed to a boundary between a crystalline area and an amorphous area of at least one information layer is lower than the reflection coefficient at the laser beam wavelength of crystallizing the recording layer in advance in the other areas of the another information layers.

A second aspect of the present invention is the optical information recording medium according to the first aspect of the present invention, wherein it has a first information layer, an optical separation layer, a second information layer and a light transmittance layer on said disciform substrate in receding order from said disciform substrate.

A third aspect of the present invention is the optical information recording medium according to the second aspect of the present invention, wherein a concentric and strip-shaped area in which said first information layer is crystallized and said second information layer is in an amorphous state exists in the same radius of a disk.

A fourth aspect of the present invention is the optical information recording medium according to the third aspect of the present invention, wherein said concentric and strip-shaped area is at least on the inner radius side or rim side of the disk.

A fifth aspect of the present invention is the optical information recording medium according to the third aspect of the present invention, wherein, when a reflection coefficient of said first information layer in the amorphous state is Ra1, and the reflection coefficient in the crystalline state thereof is Rc1 at a laser beam wavelength of crystallizing said first and second information layers, it is Rc1<Ra1.

A sixth aspect of the present invention is the optical information recording medium according to the second aspect of the present invention, wherein a concentric and strip-shaped area in which said first information layer is in the amorphous state and said second information layer is crystallized exists in the same radius of a disk.

A seventh aspect of the present invention is the optical information recording medium according to the sixth aspect of the present invention, wherein said concentric and strip-shaped area exists at least on the inner radius side or rim side of the disk.

An eighth aspect of the present invention is the optical information recording medium according to the sixth aspect of the present invention, wherein, when a reflection coefficient of said first information layer in the amorphous state is Ra1, and the reflection coefficient thereof in the crystalline state is Rc1 at a laser beam wavelength of crystallizing said first and second information layers, it is Rc1>Ra1.

A ninth aspect of the present invention is an initialization method of the optical information recording medium having at least a first information layer, an optical separation layer, a second information layer and a light transmittance layer provided on a disciform substrate in receding order from said disciform substrate, wherein said information layer has at least a recording layer of generating the optically detectable reversible change between the amorphous phase and crystalline phase by irradiation of the energy beam, the initialization method crystallizing in advance the optical information recording medium capable of recording and reproducing the signals in each information layer by the laser beam irradiated through said light transmittance layer, and it is the initialization method of the optical information recording medium, wherein, at a wavelength of the laser beam of crystallizing said recording layer in advance, the initialization of said second information layer is started from the area of said second information layer opposed to the inside of the area of a low reflection coefficient of said first information layer.

A tenth aspect of the present invention is the initialization method of the optical information recording medium according to the ninth aspect of the present invention, wherein, if Rc1<Ra1 when the reflection coefficient of said first information layer in the amorphous state is Ra1 and the reflection coefficient in the crystalline state is Rc1, the initialization of said second information layer is started from the area of said second information layer opposed to the inside of the area in which said first information layer is crystallized in advance.

An eleventh aspect of the present invention is the initialization method of the optical information recording medium according to the ninth aspect of the present invention, wherein, if Rc1>Ra1 when the reflection coefficient of said first information layer in the amorphous state is Ra1 and the reflection coefficient in the crystalline state is Rc1, the initialization of said second information layer is started from the area of said second information layer opposed to the inside of the area in which said first information layer is in the amorphous state.

A twelfth aspect of the present invention is the initialization method of the optical information recording medium having at least the first information layer, optical separation layer, second information layer and light transmittance layer provided on the disciform substrate in receding order from said disciform substrate, wherein said information layer has at least a recording layer of generating the optically detectable reversible change between the amorphous phase and crystalline phase by irradiation of the energy beam, the initialization method crystallizing in advance the optical information recording medium capable of recording and reproducing the signals in each information layer by the laser beam irradiated through said light transmittance layer, and it is the initialization method of the optical information recording medium, wherein, in the case where the transmittance of said second information layer in the crystalline state is lower than that in the amorphous state, the initialization is performed in order of the first information layer and second information layer in the same radius of the first and second information layers, and in the case where the transmittance of said second information layer in the crystalline state is higher than that in the amorphous state, the initialization is performed in order of the second information layer and first information layer in the same radius of the first and second information layers.

A thirteenth aspect of the present invention is the initialization method of the optical information recording medium according to either the tenth or eleventh aspect of the present invention, wherein the medium has an optical head of initializing said information layers, and uses the optical head to initialize the first information layer and second information layer in order.

A fourteenth aspect of the present invention is the initialization method of the optical information recording medium according to the twelfth aspect of the present invention, wherein the medium has an optical head of initializing said information layers, and uses the optical head to initialize the first information layer and second information layer.

A fifteenth aspect of the present invention is the initialization method of the optical information recording medium according to one of the ninth to eleventh aspects of the present invention, wherein initialization areas of the first information layer and second information layer are different.

DESCRIPTION OF SYMBOLS

Figure 1:
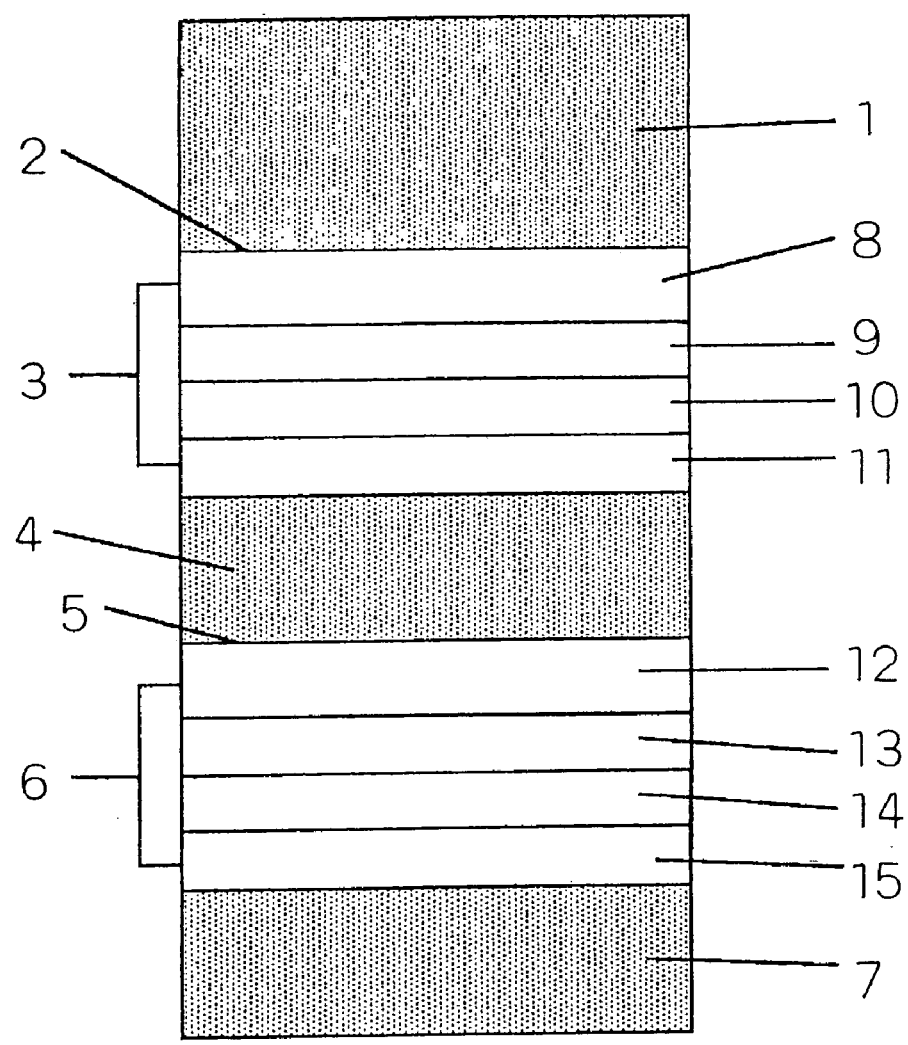
FIG. 1 is a structure diagram of an optical disk according to an embodiment of the present invention.

1 Substrate
2 Substrate surface
3 First information layer
4 Optical separation layer
5 Surface of the optical separation layer
6 Second information layer
7 Light transmittance layer
8 Reflection layer 9 Protection layer
10 Recording layer
11 Protection layer
12 Reflection layer
13 Protection layer
14 Recording layer
15 Protection layer We developed the phase-change optical disk of the one-side multilayered configuration using the blue-violet laser light. For instance, it has a first information layer, an optical separation layer, a second information layer and a light transmittance layer provided on a transparent substrate. And a problem arose in the initialization process. There were the cases where the initialization process was successful and the cases where it was unsuccessful depending on the disk configuration.

To be more specific, the first information layer and second information layer were processed for initialization one by one, but the initialization failed because the laser beam did not focus successfully on the layer to be initialized afterward depending on the disk configuration.

In an attempt to focus on the layer to be initialized, the initialization was successful with 90-percent probability. The remaining 10 percent was the cases of failure in the focusing for initialization. There were also the cases of unsuccessful initialization depending on the order of the initialization of the first information layer and second information layer.

Figure 3:
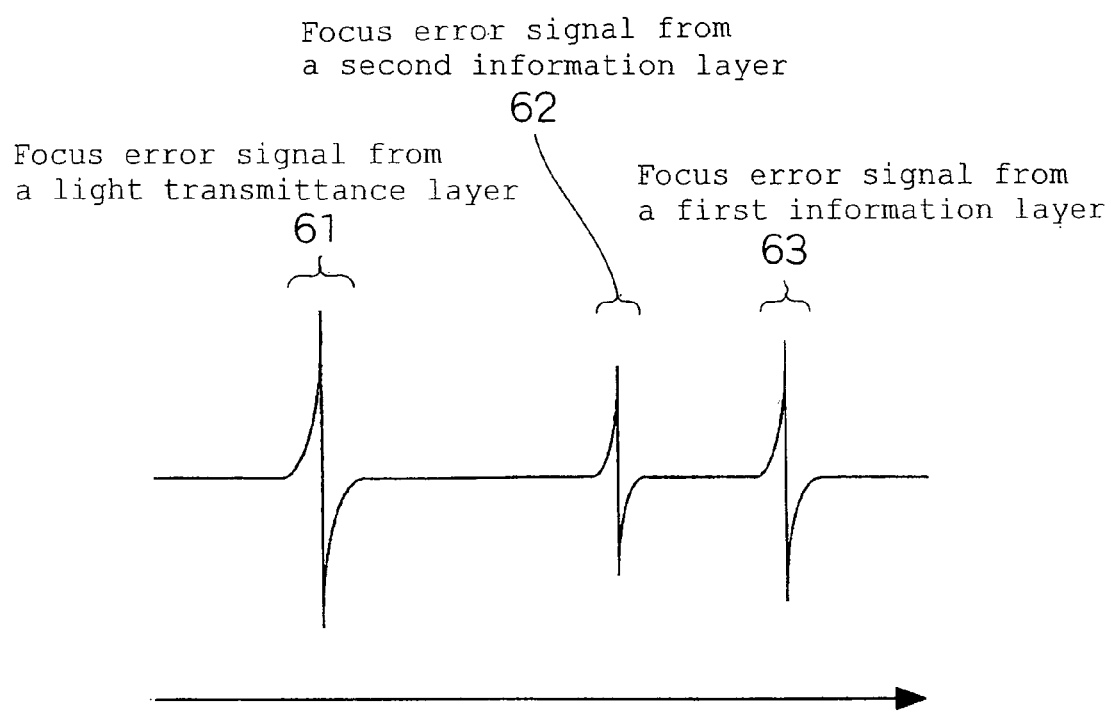
FIG. 3 is a diagram of focus error signals for initialization of an optical disk in the past.

The cause of the failure in the initialization can be considered as follows. If the optical head of irradiating the laser beam is moved closer to the light transmittance layer for the sake of the initialization, three signals, that is, a focus error signal 61 from the light transmittance layer, a focus error signal 62 from the second information layer and a focus error signal 63 from the first information layer are detected in that order as shown in FIG. 3.

As for detected sizes of the three focus error signals, however, they are large in the case where a reflection coefficient of each information layer is high, and are small in the case where it is low. The reflection coefficient of each information layer changes according to its thin film configuration and combination of phase state (whether amorphous or crystalline), and the probability of the failure in the initialization becomes higher in the case where the focus error signals are small.

Thus, it is necessary to select the order of initialization of the layers and a radial position of starting the initialization of the information layer to be initialized afterward so that the focus error signals will become larger.

In consideration of mass production of the disks, it is necessary, for the sake of initializing a plurality of the layers, to change initialization conditions for the initialization of the information layers (for instance, linear velocity, laser beam power for the initialization, pickup feed width, laser beam defocus volume to the information layers and so on).

An initialization apparatus for the mass production having one pickup is used for the initialization of a DVD-RAM and so on currently commercialized. To initialize the optical disk having a plurality of information layers currently under development by us in mass production without new capital investment and by using an existing initialization apparatus, the information layers must be initialized one by one in order.

In that case, it is thinkable to initialize each information layer with an initialization apparatus dedicated to such information layer. When doing so, it is necessary to replace disks on an initialization apparatus.

As a problem in that case, even if the position of starting the initialization is set to be the same for all the layers by replacing the disks, there is a possibility that the position of starting the initialization may subtly deviate due to a disk mounting error on replacement. In such a case, it is thinkable that an initialization yield lowers, even if the initialization order of the layers is considered.

BEST MODE FOR CARRYING OUT THE INVENTION

Hereafter, the present invention will be described by using the drawings.

The structure of the disc used in this embodiment will be described by using FIG. 1. In FIG. 1, laser beams of recording and reproducing information and initializing information layers are incident from a light transmittance layer 7 side respectively. A substrate 1 is comprised of a resin plate such as polycarbonate or PMMA, a glass plate and so on. A substrate surface 2 is covered with a spiral or concentric continuous groove and so on.

A first information layer 3 is provided on the substrate 1. The first information layer has at least a reflection layer 8, protection layers 9 and 11, and a recording layer 10.

An optical separation layer 4 is formed on the first information layer 3. The optical separation layer 4 has only to be a material transparent against a wavelength of a laser beam irradiated to record and reproduce a signal in the first information layer 3, and has a function of optically separating the first information layer from the second information layer. As for the optical separation layer, there are a method of forming a layer made of an ultraviolet hardening resin or the like by means of a spin coat, a method of adhering a transparent film with adhesive tape or the ultraviolet hardening resin, and so on. A surface of the optical separation layer 5 is covered with the spiral or concentric continuous groove and so on.

A second information layer 6 is formed on the optical separation layer 4. The second information layer 6 has at least a reflection layer 12, protection layers 13 and 15, and a recording layer 14. A light transmittance layer 7 is formed on the second information layer 6. As for the light transmittance layer 7, there are the cases where the layer made of the ultraviolet hardening resin or the like is formed by a spin coat method or the transparent film is adhered on the second optical information layer 6 with the adhesive tape or the ultraviolet hardening resin and so on so as to form it.

As for the material of the protection layers 9, 11, 13 and 15, oxides of an element such as Al, Si, Ta, Mo, W and Zr, a sulfide such as ZnS, nitrides of an element such as Al, B, Ge, Si, Ti and Zr, and fluorides of an element such as Pb, Mg and La. The material having a composition of ZnS-20 mol % $SiO_2$ was used in this embodiment.

As for the material of the recording layers 10 and 14, a phase-change material of which main components are Te, In, Se and so on may be used. As for well-known main components of the phase-change material, there are TeGeSb, TeGeSn, TeGeSnAu, SbSe, SbTe, SbSeTe, In—Te, In—Se, In—Se—Tl, InSbInSbSe, GeSbTeAg and so on. Material systems of phase-change optical disks which are currently commercialized or researched a great deal are a GeSbTe system and an AgGeSbTe system. These recording layers usually have the film formed in the amorphous state. In the case of using these recording layer materials, a transmittance in the crystalline state is smaller than a transmittance in the amorphous state as to infrared light wavelength generally used for initialization of the recording layers. The material of the GeSbTe system is mainly used in this embodiment.

As for the reflection layers 8 and 12, the material of which main components are metal elements such as Ag, Au and Al may be used. It is also possible to obtain the same optical characteristic as a non-transmittance layer by laminating two or more kinds of protection layers of different refractive indexes instead of a metal reflection layer. The metal reflection layer of which main component is Ag is used in this embodiment.

Although it is not described in FIG. 1, it is also desirable to provide C and a nitride interface layer between the recording layer 10 and the protection layers 9, 11 and between the recording layer 14 and the protection layers 13, 15 for the purposes of enhancing crystallizability of the recording layers and securing a good cycle characteristic of record erasure. The main material of the nitride interface layer is the material including at least one element of Ge, Cr, Si, Al and Te.

As for the method of forming the layers such as the protection layer, recording layer, reflection layer and nitride interface layer, an electron beam deposition method, a sputtering method, an ion plating method, a CVD method, a laser sputtering method and soon are usually adapted. The sputtering method is used in this embodiment.

Figure 2:
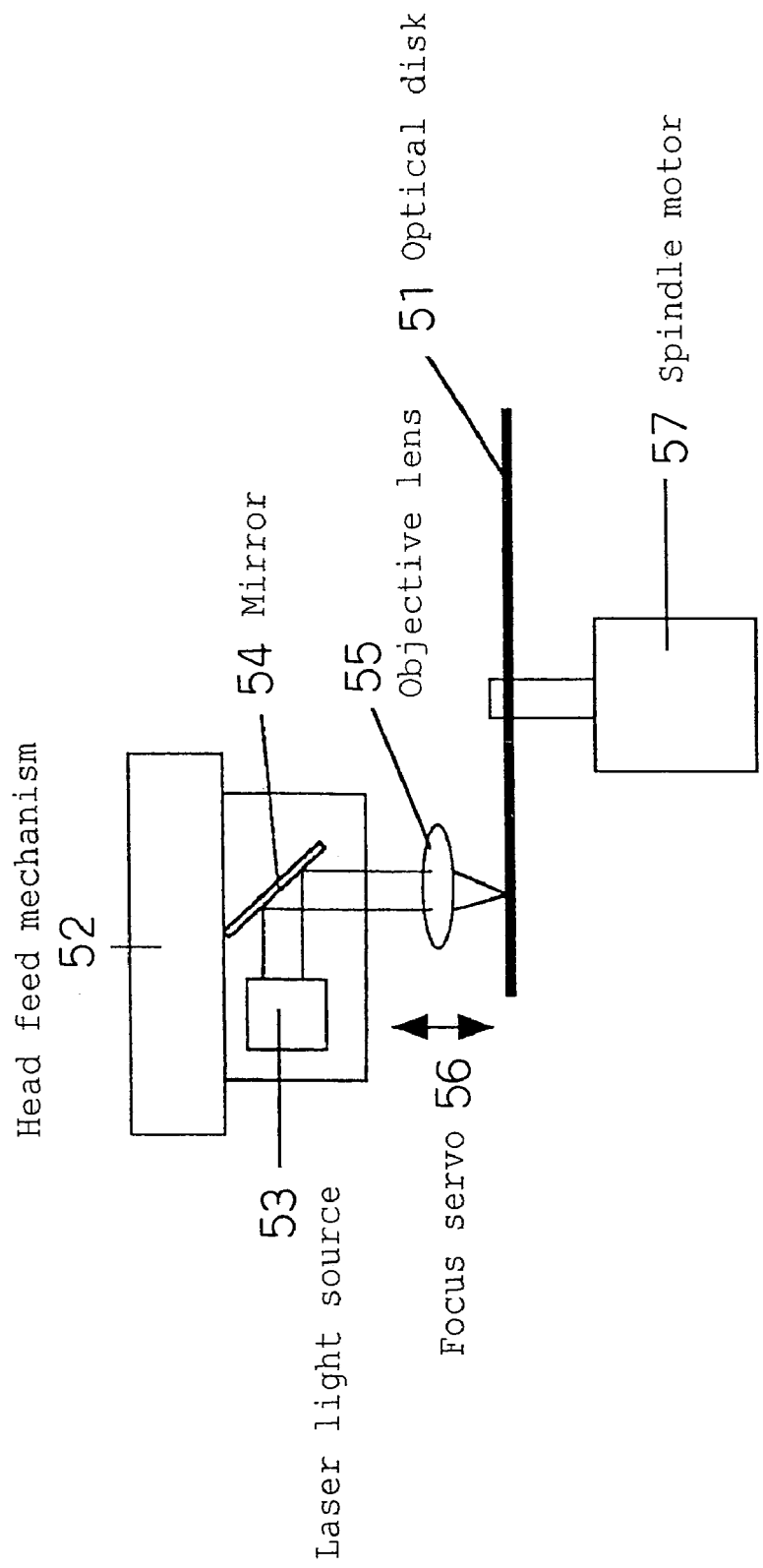
FIG. 2 is a structure diagram of an optical disk initialization apparatus according to the embodiment of the present invention.

Next, a description will be given as to the process of initializing the above-mentioned optical information recording medium of a one-side two-layer configuration by using the laser beam. An overview of an initialization apparatus is shown in FIG. 2. As shown in FIG. 2, the initialization apparatus is an apparatus of initializing an optical disk 51, and is comprised of a head feed mechanism 52, a laser light source 53, a mirror 54, an objective lens 55, a focus servo 56 and a spindle motor 57. The laser beam irradiated from the laser light source 53 is focused on the second information layer or first information layer by the objective lens 55 by using an astigmatic method for instance. At this time, focus error signals obtained from the first and second information layers are used. As for the method of exerting focusing control, various methods such as a knife-edge method can be taken.

Furthermore, a description will be given as to a procedure of, after forming both the first and second information layers, differentiating the first information layer from the second information layer and focusing the laser beam for initialization on a desired information layer on initializing each information layer. The optical head of irradiating the laser beam for the initialization is brought closer to the light transmittance layer, and three focus error signals of achieving focus from the light transmittance layer, second information layer and first information layer are detected in order. To detect the three focus error signals and initialize the second information layer for instance, the focus is achieved on the second focus error signal of the focus error signals detected in the case of bringing the optical head closer to the light transmittance layer. Or inversely, after detecting the focus error signal from the first information layer, the work of achieving focus on the second focus error signal on separating the optical head from the light transmittance layer is performed in the initialization apparatus (in the case of a plurality of information layers instead of two, focusing is performed by the same method).

The following plurality of patterns are understood as the method of initializing the first and second information layers.

(1) To initialize each information layer immediately after forming it.

(2) To initialize each information layer immediately after forming it and forming the optical separation layer (light transmittance layer in the case of the second information layer) thereon.

(3) To perform the initialization after forming the first information layer, optical separation layer, second information layer and light transmittance layer (the light transmittance layer may be formed after the initialization).

(4) In the case of (3), to initialize the first information layer earlier than the second information layer (and vice versa).

As high laser power is required for crystallization (initialization) using the laser beam, it is general to use an infrared laser beam of 800 nm or so as to the laser beam wavelength.

The disk structure used in this embodiment will be described in detail. As an example of the disk structure, an Ag reflection layer, GeN, ZnS-20 mol % $SiO_2$, $Ge_{22}Sb_{25}Te_{53}$ (at %) and ZnS-20 mol % $SiO_2$ are formed in this order by a magnetron sputter method on a polycarbonate substrate of 120 mm diameter and 1.1 mm thickness of which surface is covered with a concavo-convex guide groove of 0.3 μm pitch and 20 nm groove depth so as to form the first information layer. Subsequently, the optical separation layer is formed by putting the polycarbonate of 120 mm radius and 25 μm thickness of which surface is covered with the concave-convex guide groove of 0.3 μm pitch and 20 nm groove depth on the first information layer by using ultraviolet hardening resin such that 30 μm total thickness if formed. Subsequently, the Ag reflection layer, GeN, $Ge_{22}Sb_{25}Te_{53}$ (at %) and ZnS-20 mol % $SiO_2$ are formed in this order by a magnetron sputter method on the optical separation layer so as to form the second information layer. Subsequently, the light transmittance layer of 0.1 mm thickness is formed by the spin coat method.

The information layers are initialized by using the initialization apparatus having a laser light source of 810 nm wavelength shown in FIG. 2 and experimentally seeking appropriate laser power at linear velocity of 6 m/s and a feed pitch of 20 μm for each of the first and second information layers. The width of the laser beam for the initialization in a radial direction on the disk is 50 μm. The information layers are initialized after forming the first information layer, optical separation layer, second information layer and light transmittance layer.

According to this embodiment, the two information layers are initialized in order by using one laser beam for the initialization.

The contents described above are applied likewise to first and second embodiments described below.

First Embodiment

When the transmittance of the second information layer in the amorphous state at the laser beam wavelength of performing the initialization is Ta2 and the transmittance in the crystalline state is Tc2, the results of reviewing the sizes of Tc2 and Ta2 and the initialization order of the information layers will be described.

The disk configuration used for the review is as follows. The first information layer has the configuration of the Ag reflection layer of 100 nm, GeN layer of 5 nm, ZnS-20 mol % $SiO_2$ layer of 25 nm, GeSbTe recording layer of 15 nm and ZnS-20 mol % SiO$_2$ layer of 60 nm. As for the second information layer, there are two different types of recording layer compositions provided. As for a disk 1, after forming the optical separation layer on the first information layer, there are the Ag reflection layer of 10 nm, GeN layer of 5 nm, ZnS-20 mol % SiO$_2$ layer of 24 nm, GeSbTe recording layer of 6 nm and ZnS —SiO$_2$ layer of 50 nm. As for a disk 2, the film thickness of each layer is the same as the disk 1, but it is rendered as the disk by only changing the recording layer composition to GaSb. And the light transmittance layer is formed on the second information layer. The transmittances and reflection coefficients of the first and second information layers at the initialization laser beam wavelength are shown in Table 1.

TABLE 1

| Disk | Reflection coefficient | | Transmittance | |
|---|---|---|---|---|
| | Amorphous | Crystalline | Amorphous | Crystalline |
| First information layer | 20% | 7% | 0% | 0% |
| Second information layer | | | | |
| Disk 1 | 5% | 2% | 60% | 40% |
| Disk 2 | 2% | 5% | 40% | 60% |

The above one-side two-layer disk is used to review the yield after the initialization of the two layers is finally completed in the case of initializing the second information layer after initializing the first information layer and vice versa.

In this case, the radial positions of starting the initialization of the first and second information layers are the same, that is, from about 23 mm. In doing so, the disk is removed once from the initialization apparatus after finishing the initialization of the first layer, and the disk is mounted on the initialization apparatus again after setting the initialization condition for the next layer. The yield results of the initialization are shown in (Table 2).

TABLE 2

| Disk | Initialization in order of the first –> second information layers | Initialization in order of the second –> first information layers |
|---|---|---|
| 1 | 95% | 80% |
| 2 | 80% | 90% |

According to (Table 2), for the disk 1 the initialization yield is improved in the case of initializing the second information layer after initializing the first information layer rather than the inverse case. As for the disk 2, initialization mistakes are made less often in the case of initializing the first information layer after initializing the second information layer than the inverse case.

The reflection coefficients of the laser beams returning from the information layers of each disk to the optical head for the initialization are shown in Table 3.

TABLE 3

| | Disk 1 | Disk 2 |
|---|---|---|
| Initialization in order of the first –> second information layers Non-initialized state | | |
| First information layer | 7.2% | 3.2% |
| Second information layer | 5.0% | 2.0% |
| After initialization of the first information layer | | |
| First information layer | 2.5% | 2.5% |
| Second information layer | 5.0% | 2.0% |
| Initialization in order of the second –> first information layers Non-initialized state | | |
| First information layer | 7.2% | 3.2% |
| Second information layer | 5.0% | 2.0% |
| After initialization of the second information layer | | |
| First information layer | 3.2% | 7.2% |
| Second information layer | 2.0% | 5.0% |

According to Table 3, in the case of initialization in order of the first to second information layers, the reflection coefficient of the first information layer is as high as about 7.2 percent, and so the focus error signals are also large enough to facilitate focusing so that the yield is good. In the case of initializing the second information layer, the reflection coefficient is about 5.0 percent, and the reflection coefficient of the first information layer at that time is as low as about 2.5 percent so that a possibility of focusing on the first information layer by mistake is low, and so the yield should be good. In the case of initialization in order of the second to first information layers, the reflection coefficient of the second information layer is about 5.0 percent, but the reflection coefficient of the first information layer at that time is as high as about 7.2 percent so that there is a possibility of focusing on the first information layer by mistake. Furthermore, the reflection coefficient on initializing the first information layer is low as with the reflection coefficient of the second information layer and close thereto, and so it is thinkable that a mistake was made in the initialization of the first information layer. In the case of the disk 2, it is understood the same reason that the yield improved better in the case of starting the initialization from the second information layer than in the case of starting the initialization from the first information layer.

To be more specific, in the case where the transmittance of the second information layer in the crystalline state is lower than that in the amorphous state, the initialization is performed in order of the first information layer and second information layer in the same radius of the first and second information layers. And in the case where the transmittance of the above described second information layer in the crystalline state is higher than that in the amorphous state, the initialization is performed in order of the second information layer and first information layer in the same radius of the first and second information layers.

If the initialization is performed in such order, the yield is improved. To be more specific, it is possible, by performing the initialization in such order, to render the focus error signals from the first information layer as large as possible when initializing the first information layer. Consequently, it occurs less often that the second information layer is focused on by mistake when initializing the first information layer.

Thus, the initialization is performed in the above order so that wrong focusing occurs less often when initializing the first information layer so as to consequently improve the yield.

As shown in the present invention, it is possible to reduce initialization mistakes and improve productivity by reviewing Tc2 and Ta2 in advance and determining the initialization order according to the results thereof.

The case of two information layers was shown according to this embodiment. However, it is also possible, in the case of three or more information layers, to stably mass-produce the disks by considering the reflection coefficient at the initialization laser beam wavelength and changing the initialization start positions of the information layers.

Second Embodiment

When the transmittance of the second information layer in the amorphous state at a laser beam wavelength of performing the initialization is Ta2, the reflection coefficient is Ra2, the transmittance in the crystalline state is Tc2, the reflection coefficient is Rc2, the reflection coefficient of the first information layer in the amorphous state without laminating the second information layer is Ra1, and the reflection coefficient in the crystalline state is Rc1, a review was made as to which case provides a better initialization yield, that is, whether to start the initialization from an amorphous area or from a crystalline area of the first information layer when initializing the second information layer after initializing magnitude relation between Rc1 and Ra1 and the first information layer. The results of the review will be described below.

The disc configuration used for the review is as follows. The first information layer has the configuration of the Ag reflection layer of 100 nm, GeN layer of 5 nm, ZnS-20 mol % $SiO_2$ layer of 25 nm, GeSbTe recording layer of 15 nm and ZnS-20 mol % $SiO_2$ layer of 60 nm on the substrate. As for the second information layer, after forming the optical separation layer on the first information layer, the disk 1 has the Ag reflection layer of 10 nm, GeN layer of 5 nm, ZnS-20 mol % $SiO_2$ layer of 24 nm, GeSbTe recording layer of 6 nm and ZnS—$SiO_2$ layer of 50 nm. And the light transmittance layer is formed on the second information layer. The transmittances and reflection coefficients of the first and second information layers at the initialization laser beam wavelength are shown in Table 4.

TABLE 4

| Disk | Reflection coefficient | | Transmittance | |
|---|---|---|---|---|
| | Amorphous | Crystalline | Amorphous | Crystalline |
| First information layer Second information layer | 20% | 7% | 0% | 0% |
| Disk 1 | 5% | 2% | 60% | 40% |

The above one-side two-layer disk is used to initialize the first information layer, and then the disk is removed once from the initialization apparatus, and the disk is mounted on the initialization apparatus again after setting the initialization condition for the second information layer so as to initialize the second information layer. The yield after completing the initialization was lastly reviewed as to both the layers.

In this case, the radial position of starting the initialization of the first information layer is from 23 mm. As for the second information layer, three kinds of the radial positions of starting the initialization of 22 mm, 23 mm and 24 mm were reviewed. To be more specific, when initializing the second information layer, the initialization is performed from the amorphous area, from the same initialization start position and from the crystalline area of the first information layer respectively. The yield results thereof are shown in (Table 5).

TABLE 5

| | The initialization of the second information layer is started from the crystalline area of the first information layer | The initialization start position is the same | The initialization of the second information layer is started from the amorphous area of the first information layer |
|---|---|---|---|
| Disk 1 | 100% | 95% | 90% |

According to (Table 5), in initializing the second information layer on the disk 1, the yield is reduced in order of starting the initialization from the crystalline area, the same initialization start position and starting it from the amorphous area of the first information layer.

Table 6 shows the initialization start positions and the reflection coefficients of the laser beams returning from the information layers to the optical head for the initialization.

TABLE 6

Disk 1

| | The initialization of the second information layer is started from the crystalline area of the first information layer. | The initialization of the second information layer is started from the amorphous area of the first information layer. |
|---|---|---|
| On initializing the second information layer Non-initialized state | | |
| First information layer | 7.2% | 7.2% |
| Second information layer | 5.0% | 5.0% |
| After initializing the first information layer | | |
| First information layer | 2.5% | 7.2% |
| Second information layer | 5.0% | 5.0% |

Figure 4:
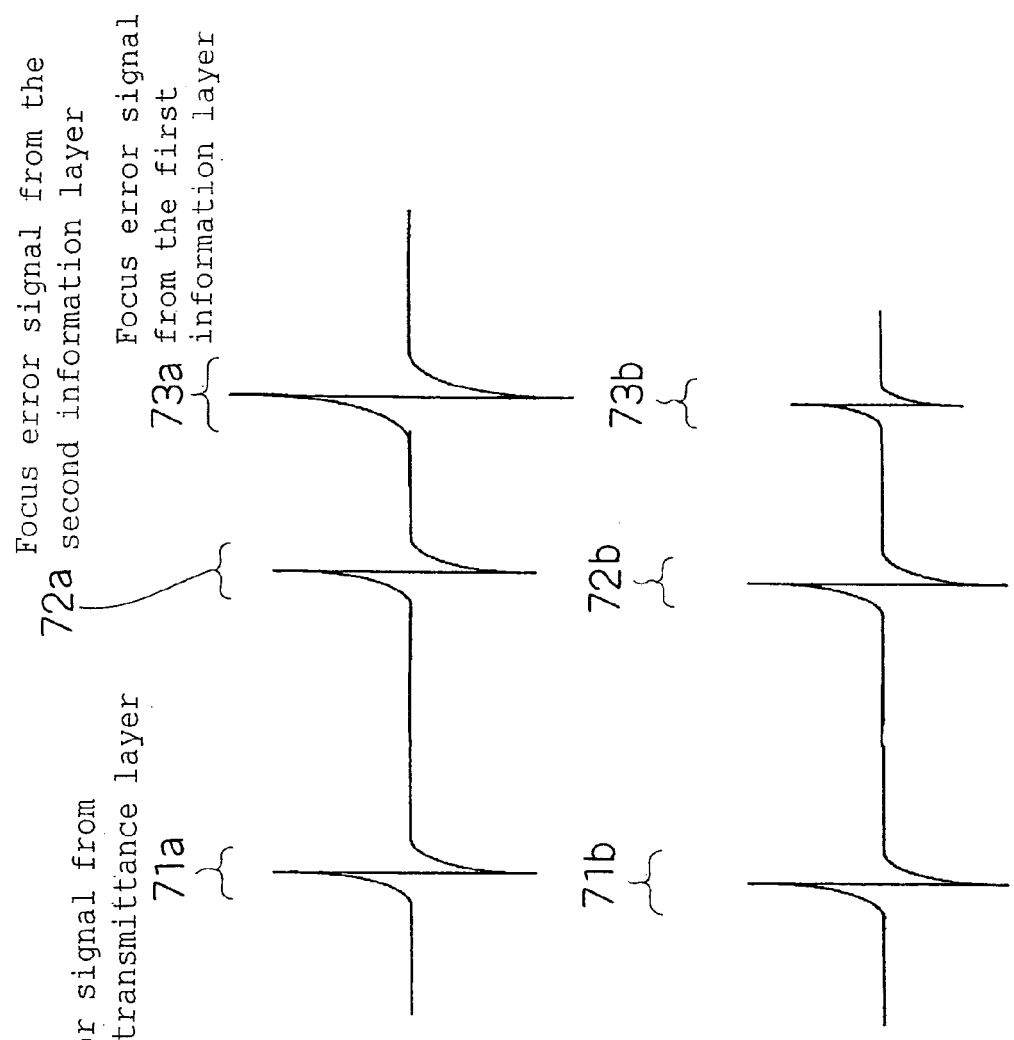
FIGS. 4A–4B are diagrams of focus error signals for initialization of the optical disk according to the embodiment of the present invention.

According to Table 6, in the case of initializing the first information layer first on the disk 1, the reflection coefficient of the first information layer is as high as about 7.2 percent, and so the focus error signals are also large enough to facilitate the focusing so that the yield is good. FIGS. 4A and 4B show comparisons of the sizes of the focus error signals according to differences in disk radial positions after the initialization of the first information layer.

FIG. 4A shows the focus error signals at 22 mm radius, which is equivalent to the case of starting the initialization of the second information layer from the amorphous area of the first information layer. Here, a focus error signal 71a from the light transmittance layer, a focus error signal 72a from the second information layer and a focus error signal 73a from the first information layer are approximately of the same size. FIG. 4B shows the focus error signals at 24 mm radius, which is equivalent to the case of starting the initialization of the second information layer from the crystalline area of the first information layer. Here, the focus error signal 73b from the first information layer is smaller than a focus error signal 71b from the light transmittance layer and the focus error signal 72b from the second information layer. To be more specific, the focus error signal 73a from the first information layer in FIG. 4A is smaller than the focus error signal 73b from the first information layer in FIG. 4B.

In the case of starting the initialization of the second information layer from the crystalline area of the first information layer, the reflection coefficient on initializing the second information layer is about 5.0 percent on the disk 1, and the reflection coefficient of the first information layer at that time is as low as about 2.5 percent. For that reason, there is no possibility of focusing on the first information layer by mistake, and so the yield is supposedly 100 percent. In the case of starting the initialization of the second information layer from the amorphous area of the first information layer, the reflection coefficient on initializing the second information layer is about 5.0 percent on the disk 1. However, the reflection coefficient from the first information layer is about 7.2 percent, and it is understood to focus on the first information layer by mistake, thereby reducing the yield.

In the case of the same initialization start position, the reflection coefficient should be the same as that in the case of starting the initialization of the second information layer from the crystalline area of the first information layer. In reality, however, the yield results are reduced. The cause thereof is supposedly that, as the disk is replaced on initializing the second information layer after initializing the first information layer, the pickup of the initialization apparatus detects reflected light from the amorphous area of the first information layer due to an error in mounting the disk on the initialization apparatus for the replacement so that the focusing fails. The mounting error in the disk replacement supposedly occurs from an error in internal or external diameter of the disk or a dimensional error of a disk receptacle portion of the initialization apparatus.

According to the present invention, it is possible to decrease initialization mistakes and improve the productivity by reviewing Rc1 and Ra1 in advance and consequently differentiating the radial position of starting the initialization of the second information layer from that of the first information layer.

The results of the disk which is Rc1<Ra1 were reported in this embodiment. As for the disk which is Rc1>Ra1, it is possible to decrease initialization mistakes and improve the productivity likewise by starting the initialization of the second information layer from the crystalline area of the first information layer.

In the case of performing the initialization in order of the second information layer and first information layer, the initialization of the first information layer is started from the crystalline area of the second information layer if Rc2<Ra2, or the initialization of the first information layer is started from the amorphous area of the second information layer if Rc2>Ra2 so as to improve the initialization yield likewise.

The above will be described further in detail by using FIGS. 5 and 6.

Figure 5:
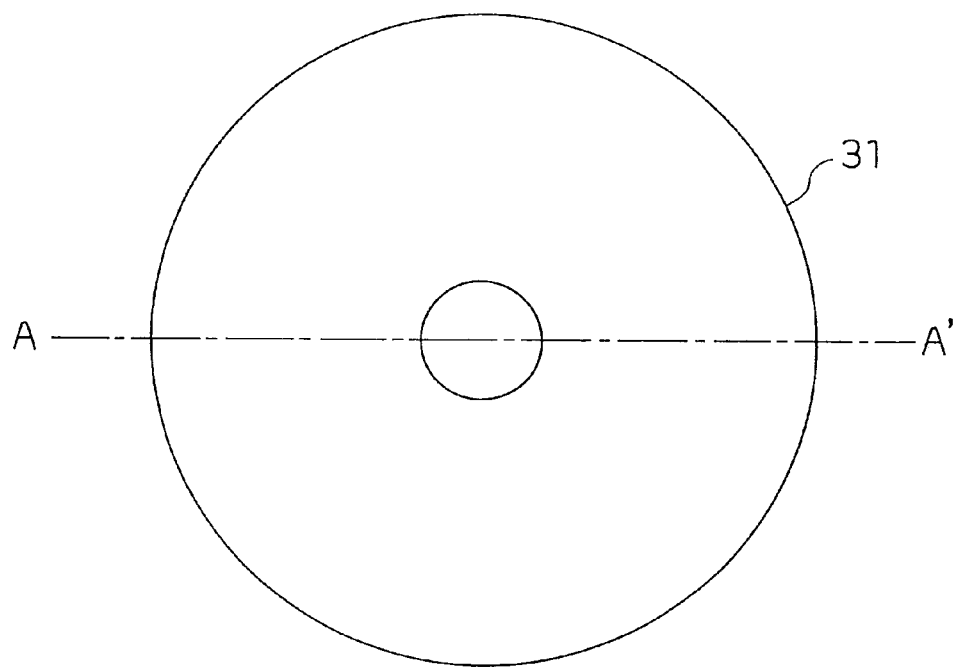
FIGS. 5A–5B are is a diagrams showing the configuration of the optical disk (optical information recording medium) according to the embodiment of the present invention.
Figure 5:
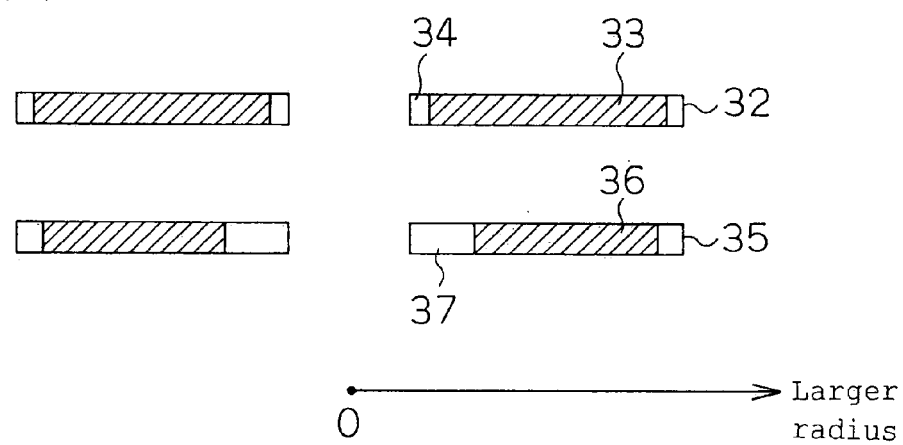

FIGS. 5A and 5B show an optical information recording medium 31 in the case of Rc1<Ra1, that is, in the case where the reflection coefficient at the laser beam wavelength of crystallizing the recording layer in advance in the crystalline state of the first information layer is smaller than the reflection coefficient at the laser beam wavelength of crystallizing the recording layer in advance in the amorphous state of the first information layer. FIG. 5A is a front view of the optical information recording medium 31, and FIG. 5B is a diagram illustrating a first information layer 32 and a second information layer 35 as to an AA' cross-section of the optical information recording medium 31 in FIG. 5.

The optical information recording medium 31 has a disciform shape having around hole at the center thereof. The optical information recording medium 31 has both the first information layer 32 and second information layer 35 already initialized. When initializing the second information layer 35, the initialization is performed from the inner radius side toward the rim side of the optical information recording medium 31.

In this case, paying attention to the inner radius side of the optical information recording medium 31 as shown in FIG. 5B, the first information layer 32 is in an amorphous state 34 as to the radius of less than 22 mm, and the first information layer 32 is in a crystalline state 33 as to the radius of 22 mm or more. Also, paying attention to the inner radius side, the second information layer 35 is in an amorphous state 37 as to the radius of less than 23 mm, and the second information layer 35 is in a crystalline state 36 as to the radius of about 23 mm or more. Therefore, in the area of the radius between 22 mm and 23 mm of the optical information recording medium 31, the first information layer 32 is in the crystalline state and the second information layer 35 is in the amorphous state. To be more specific, a concentric and strip-shaped area in which the first information layer 32 is in the crystalline state and the second information layer 35 is in the amorphous state exists in the optical information recording medium 31, such as the area of the radius between about 22 mm and 23 mm thereof. And this concentric and strip-shaped area at least exists on the inner radius side of the disk in the case where the second information layer 35 is initialized from the inner radius side toward the rim side of the optical information recording medium 31.

In other words, on the inner radius side of the disk, the reflection coefficient at the laser beam wavelength of crystallizing the recording layer in advance in the area of the first information layer 32 opposed to a boundary with the area in the crystalline state 36 and the area in the amorphous state 37 of the second information layer 35 is lower than the reflection coefficient at the laser beam wavelength of crystallizing the recording layer in advance in the other areas of the first information layer 32.

To be more specific, the initialization of the second information layer 35 is started from the area of the second information layer 35 opposed to the inside of the area of a low reflection coefficient of the first information layer 32. As it is Rc1<Ra1, the initialization of the second information layer 35 is started from the area of the second information layer 35 opposed to the inside of the area in which the first information layer 32 is crystallized.

Such an optical information recording medium 31 provides a better yield compared to the case where the initialization of the second information layer is started from the area of the second information layer opposed to the inside of the area in which the first information layer is in the amorphous state. To be more specific, when initializing the second information layer 35 in order from the inner radius side toward the rim side, the initialization is started from the area of the second information layer 35 opposed to the area in which the first information layer 32 is in the crystalline state 33. Therefore, when starting the initialization of the second information layer 35, the initialization is started from the area of the second information layer 35 opposed to the area of a low reflection coefficient of the first information layer 32. And thus, the focus error signals of the first information layer 32 become smaller on starting the initialization of the second information layer 35 so that the first information layer 32 is less often focused on by mistake.

Therefore, in the case of Rc1<Ra1, when initializing the second information layer 35 from the inner radius side toward the rim side of the optical information recording medium 31, the second information layer 35 has its yield improved better in the optical information recording medium 31 on which the first information layer 32 is not crystallized on the inner radius side of the optical information recording medium 31 and on which the concentric and strip-shaped area in the amorphous state exists in the same radius than in any other optical information recording medium.

In the case of initializing the second information layer 35 from the inner radius side toward the rim side, the boundary between the crystalline state and the amorphous state on the rim side of the optical information recording medium 31 may coincide or be different between the first information layer 32 and the second information layer 35.

When initializing the second information layer 35 from the rim side toward the inner radius side of the disk in the case of Rc1<Ra1, the yield is improved by starting the initialization of the second information layer from the inside of the area of a low reflection coefficient of the first information layer. To be more specific, as it is Rc1<Ra1 in this case, the yield is improved by starting the initialization of the second information layer from the area of the second information layer opposed to the inside of the area in which the first information layer is crystallized.

Figure 6:
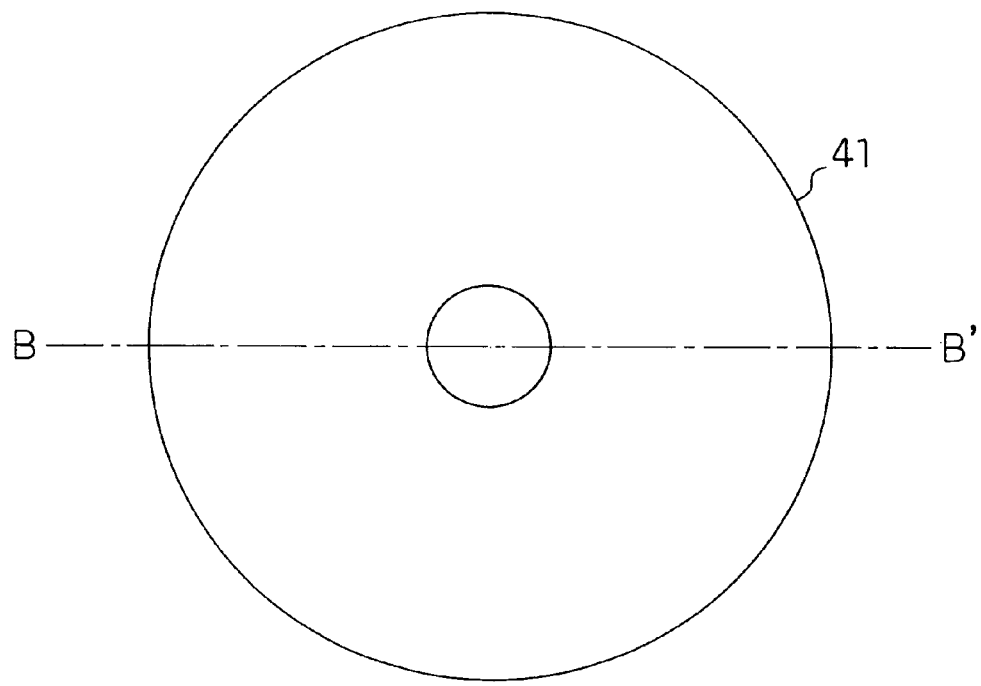
FIGS. 6A–6B are diagrams showing the configuration of the optical disk (optical information recording medium) according to the embodiment of the present invention.
Figure 6:
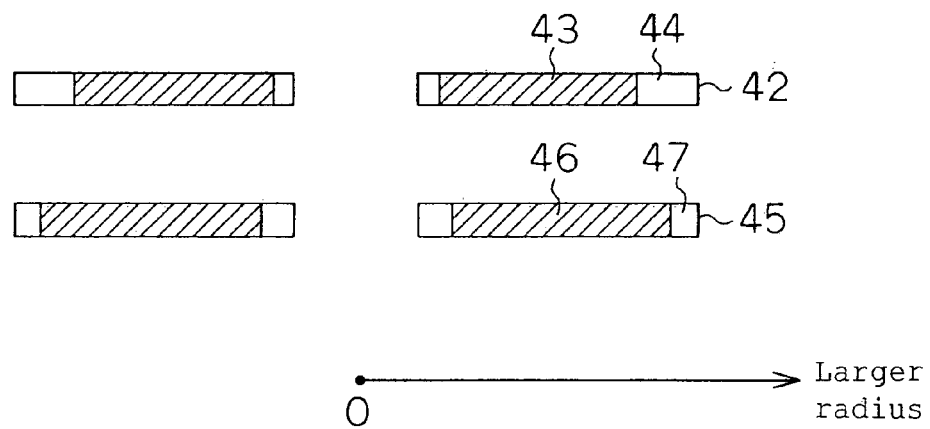

Next, FIGS. 6A and 6B show an optical information recording medium 41 in the case of Rc1>Ra1, that is, in the case where the reflection coefficient in the crystalline state of the first information layer is larger than the reflection coefficient in the amorphous state thereof. FIG. 6A is a front view of the optical information recording medium 41, and FIG. 6B is a diagram illustrating a first information layer 42 and a second information layer 45 as to a BB' cross-section of the optical information recording medium 41 in FIG. 6.

The optical information recording medium 41 has a disciform shape having a round hole at the center thereof as with the optical information recording medium 31. The optical information recording medium 41 has both the first information layer 42 and second information layer 45 already initialized. When initializing the second information layer 45, the initialization is performed from the rim side toward the inner radius side of the optical information recording medium 41.

In this case, paying attention to the rim side of the optical information recording medium 41 as shown in FIG. 6B, the first information layer 42 is in an amorphous state 44 in the area having the radius of more than 58 mm, and the first information layer 42 is in the crystalline state 43 in the area having the radius of about 58 mm or less. Also, paying attention to the rim side, the second information layer 45 is in an amorphous state 47 in the area having the radius of more than 59 mm, and the second information layer 45 is in a crystalline state 46 in the area having the radius of about 59 mm or less.

Therefore, in the area of the radius between about 58 mm and 59 mm of the optical information recording medium 41, the first information layer 42 is in the amorphous state and the second information layer 45 is in the crystalline state. To be more specific, the concentric and strip-shaped area in which the first information layer 42 is in the amorphous state and the second information layer 45 is in the crystalline state exists in the optical information recording medium 41, such as the area of the radius between about 58 mm and 59 mm thereof. And this concentric and strip-shaped area at least exists on the rim side of the disk in the case where the second information layer 45 is initialized from the rim side toward the inner radius side of the optical information recording medium 41.

In other words, on the rim side of the disk, the reflection coefficient in the area of the first information layer 42 opposed to a boundary between the area in the crystalline state 46 and the area in the amorphous state 47 of the second information layer 45 is lower than the reflection coefficient in the other areas of the first information layer 42.

To be more specific, the initialization of the second information layer 45 is started from the area of the second information layer 45 opposed to the inside of the area of a low reflection coefficient of the first information layer 42. As it is Rc1>Ra1, the initialization of the second information layer 45 is started from the inside of the area in which the first information layer 42 is in the amorphous state.

Such an optical information recording medium 41 provides a better yield compared to the case where the initialization of the second information layer is started from the area of the second information layer opposed to the inside of the area in which the first information layer is in the crystalline state. To be more specific, when initializing the second information layer 45 in order from the rim side toward the inner radius side, the initialization is started from the area of the second information layer 45 opposed to the area in which the first information layer 42 is in the amorphous state 44. Therefore, when starting the initialization of the second information layer 45, the initialization is started from the area of the second information layer 45 opposed to the area of a low reflection coefficient of the first information layer 42. And thus, the focus error signals of the first information layer 42 become smaller on starting the initialization of the second information layer 45 so that the first information layer 42 is less often focused on by mistake.

Therefore, in the case of Rc1>Ra1, when initializing the second information layer 45 from the rim side toward the inner radius side of the optical information recording medium 41, the second information layer 45 has its yield improved better in the optical information recording medium 41 on which the first information layer 42 is in the amorphous state on the rim side of the optical information recording medium 41 and on which the concentric and strip-shaped area in the crystalline state exists in the same radius than in any other optical information recording medium.

In the case of initializing the second information layer 45 from the rim side toward the inner radius side, the boundary between the crystalline state and the amorphous state on the inner radius side of the optical information recording medium 41 may coincide or be different between the first information layer 42 and the second information layer 45.

When initializing the second information layer 45 from the inner radius side toward the rim side in the case of Rc1>Ra1, the yield is improved by starting the initialization of the second information layer from the area of the second information layer opposed to the inside of the area of a low reflection coefficient of the first information layer. To be more specific, as it is Rc1>Ra1 in this case, the yield is improved by starting the initialization of the second information layer from the area of the second information layer opposed to the inside of the area in which the first information layer is in the amorphous state.

Thus, the optical information recording media 31 and 41 shown in FIGS. 5A–5B and 6A–6B respectively have good yields on the initialization.

The case of two information layers was shown according to this embodiment. However, it is also possible, in the case of three or more information layers, to stably mass-produce the disks by considering the reflection coefficient at the initialization laser beam wavelength and changing the initialization start positions of the information layers.

The initialization is performed from the inner radius toward the rim according to this embodiment. However, the same effect is also obtained in the case of performing it from the rim toward the inner radius.

As described above, it is possible, by performing the initialization so that each multilayered medium has a different initialization area, to improve the productivity on manufacturing the optical information recording medium.

As is clear from the above description, the present invention can provide the optical information recording medium capable of improving production efficiency in an initialization process of optical disk mass production and an initialization method thereof.

The invention claimed is:

1. An optical information recording medium having a plurality of information layers formed on a disciform substrate, comprising:
    said information layer has at least a recording layer of generating optically detectable reversible change between an amorphous phase and a crystalline phase by irradiation of an energy beam;
    signals can be recorded and reproduced in said information layers by the irradiated laser beam;
    the recording layers included in said information layers are crystallized in a concentric strip-shape by the laser beam in advance; and
    a reflection coefficient at a laser beam wavelength of crystallizing said recording layer in advance in the area of another information layer opposed to a boundary between a crystalline area and an amorphous area of at least one information layer is lower than the reflection coefficient at the laser beam wavelength of crystallizing the recording layer in advance in the other areas of the another information layers.

2. The optical information recording medium according to claim 1, wherein it has a first information layer, an optical separation layer, a second information layer and a light transmittance layer on said disciform substrate in receding order from said disciform substrate.

3. The optical information recording medium according to claim 2, wherein a concentric and strip-shaped area in which said first information layer is crystallized and said second information layer is in an amorphous state exists in the same radius of a disk.

4. The optical information recording medium according to claim 3, wherein said concentric and strip-shaped area is at least on the inner radius side or rim side of the disk.

5. The optical information recording medium according to claim 3, wherein, when a reflection coefficient of said first information layer in the amorphous state is Ra1, and the reflection coefficient in the crystalline state thereof is Rc1 at a laser beam wavelength of crystallizing said first and second information layers, it is Rc1<Ra1.

6. The optical information recording medium according to claim 2, wherein a concentric and strip-shaped area in which said first information layer is in the amorphous state and said second information layer is crystallized exists in the same radius of a disk.

7. The optical information recording medium according to claim 6, wherein said concentric and strip-shaped area exists at least on the inner radius side or rim side of the disk.

8. The optical information recording medium according to claim 6, wherein, when a reflection coefficient of said first information layer in the amorphous state is Ra1, and the reflection coefficient thereof in the crystalline state is Rc1 at a laser beam wavelength of crystallizing said first and second information layers, it is Rc1>Ra1.

9. An initialization method of the optical information recording medium having at least a first information layer, an optical separation layer, a second information layer and a light transmittance layer provided on a disciform substrate in receding order from said disciform substrate, comprising the steps of:
    wherein said information layer has at least a recording layer of generating the optically detectable reversible change between the amorphous phase and crystalline phase by irradiation of the energy beam, the initialization method crystallizing in advance the optical information recording medium capable of recording and reproducing the signals in each information layer by the laser beam irradiated through said light transmittance layer, and
    wherein, at a wavelength of the laser beam of crystallizing said recording layer in advance, the initialization of said second information layer is started from the area of said second information layer opposed to the inside of the area of a low reflection coefficient of said first information layer.

10. The initialization method of the optical information recording medium according to claim 9, wherein, if Rc1<Ra1 when the reflection coefficient of said first information layer in the amorphous state is Ra1 and the reflection coefficient in the crystalline state is Rc1, the initialization of said second information layer is started from the area of said second information layer opposed to the inside of the area in which said first information layer is crystallized in advance.

11. The initialization method of the optical information recording medium according to claim 9, wherein, if Rc1>Ra1 when the reflection coefficient of said first information layer in the amorphous state is Ra1 and the reflection coefficient in the crystalline state is Rc1, the initialization of said second information layer is started from the area of said second information layer opposed to the inside of the area in which said first information layer is in the amorphous state.

12. An initialization method of the optical information recording medium having at least the first information layer, optical separation layer, second information layer and light transmittance layer provided on the disciform substrate in receding order from said disciform substrate, comprising the steps of:
    wherein said information layer has at least a recording layer of generating the optically detectable reversible change between the amorphous phase and crystalline phase by irradiation of the energy beam, the initializa tion method crystallizing in advance the optical information recording medium capable of recording and reproducing the signals in each information layer by the laser beam irradiated through said light transmittance layer, and wherein, in the case where the transmittance of said second information layer in the crystalline state is lower than that in the amorphous state, the initialization is performed in order of the first information layer and second information layer in the same radius of the first and second information layers, and in the case where the transmittance of said second information layer in the crystalline state is higher than that in the amorphous state, the initialization is performed in order of the second information layer and first information layer in the same radius of the first and second information layers.

13. The initialization method of the optical information recording medium according to claim 10 or 11, wherein the medium has an optical head of initializing said information layers, and uses the optical head to initialize the first information layer and second information layer in order.

14. The initialization method of the optical information recording medium according to claim 12, wherein the medium has an optical head of initializing said information layers, and uses the optical head to initialize the first information layer and second information layer.

15. The initialization method of the optical information recording medium according to any one of claims 9 to 11, wherein initialization areas of the first information layer and second information layer are different.

* * * * *